United States Patent [19]

White et al.

[11] 4,345,682
[45] Aug. 24, 1982

[54] EGG TRANSPORTING SYSTEM

[75] Inventors: Charles A. White, Woodstock; Jerome J. Kennedy, Marietta; Harold S. Wayne, Douglasville, all of Ga.

[73] Assignee: U.S. Industries, Inc., New York, N.Y.

[21] Appl. No.: 254,783

[22] Filed: Apr. 16, 1981

Related U.S. Application Data

[62] Division of Ser. No. 114,341, Jan. 22, 1980, Pat. No. 4,293,066.

[51] Int. Cl.³ ............................................. B65G 17/30
[52] U.S. Cl. ..................................... 198/635; 198/801
[58] Field of Search ............... 198/633, 635, 637, 655, 198/796, 801, 534; 119/48

[56] References Cited

U.S. PATENT DOCUMENTS

| | | | |
|---|---|---|---|
| 1,984,826 | 12/1934 | Bunker | 198/635 X |
| 2,913,761 | 11/1959 | Meyer | 198/633 |
| 3,166,175 | 1/1965 | Kurtz et al. | 198/796 X |
| 3,770,107 | 11/1973 | Michelbach | 198/796 X |
| 4,199,051 | 4/1980 | Kimberley | 198/801 X |

Primary Examiner—Jeffrey V. Nase
Attorney, Agent, or Firm—Price, Heneveld, Huizenga & Cooper

[57] ABSTRACT

An egg transporting system having a plurality of egg belt conveyors leading from cages of a poultry installation includes a transition mechanism for dividing and orienting the eggs at the output end of each of the egg belt conveyors into a plurality of separate rows and depositing the eggs on an elevator. The elevator includes a plurality of endless loop belts on which there is attached egg transporting cradles for receiving eggs from the transition mechanism at vertically and horizontally-spaced input locations at the input side of the elevator and for transporting the eggs to the opposite side of the elevator and releasing them onto a main conveyor which extends in communication with several egg elevators for accumulating and collecting eggs from the poultry installation. The transition and elevator mechanism cooperate to provide a minimum of egg breakage and a maximum conveying speed for transferring eggs from the egg belt conveyors onto the main conveyor.

5 Claims, 14 Drawing Figures

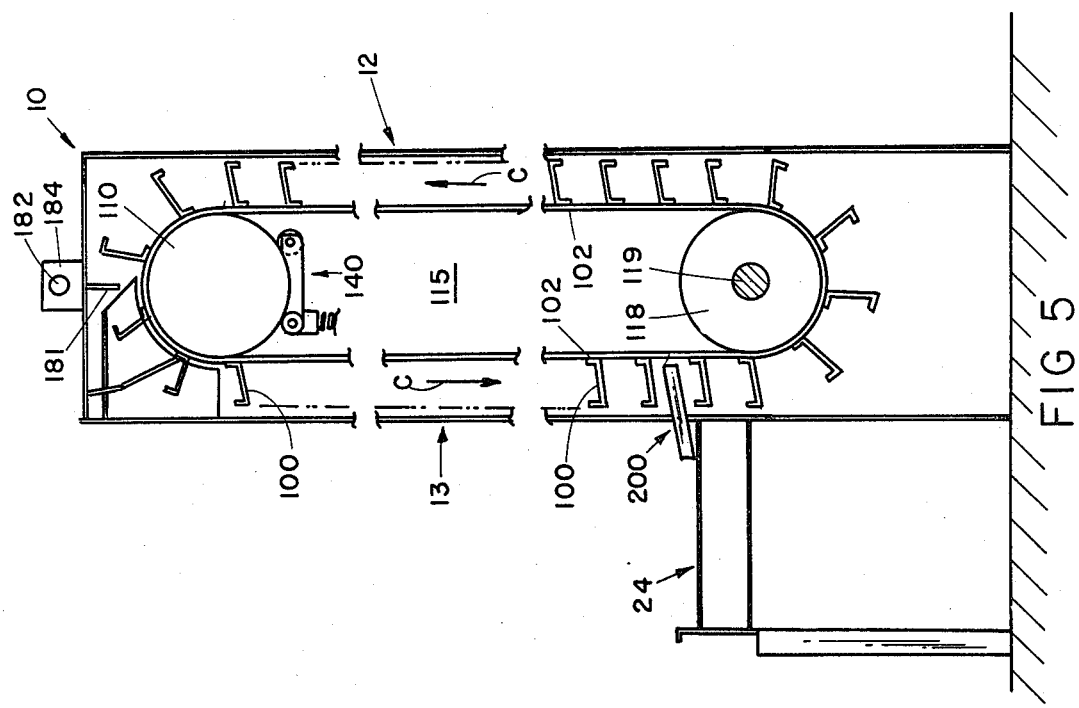
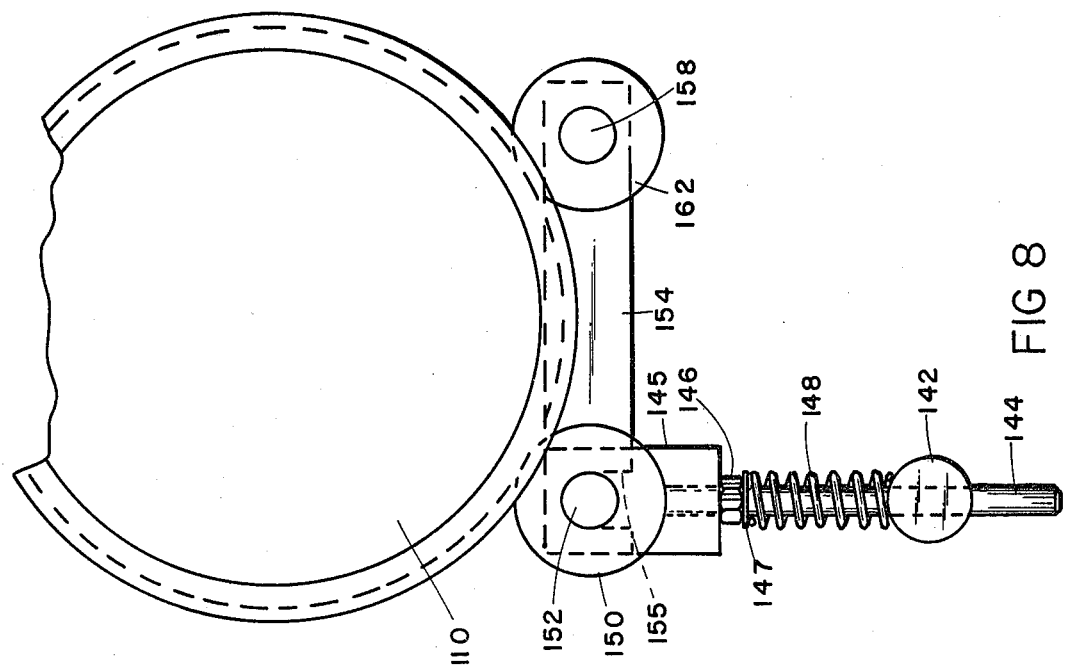

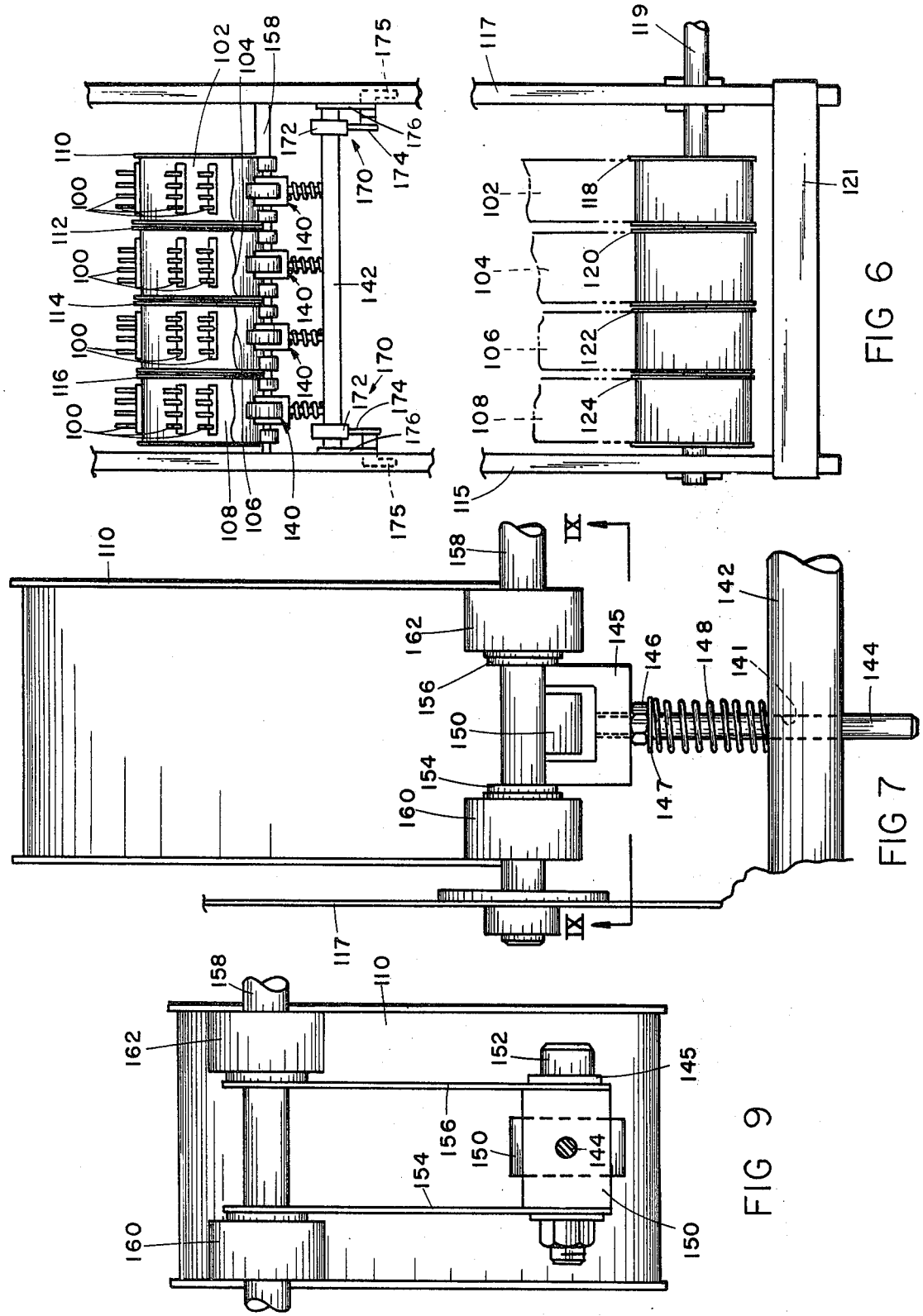

EGG TRANSPORTING SYSTEM

This is a division of application Ser. No. 114,341, filed Jan. 22, 1980 and issued Oct. 6, 1981 as U.S. Pat. No. 4,293,066.

BACKGROUND OF THE INVENTION

The present invention relates to egg handling apparatus and particularly to an egg collecting and transferring system.

In modern automated poultry systems, hens are housed in tiers of cages with egg collecting and conveying belts extending along the front of the cages for automatically transporting eggs from each of the cages to a central processing area. Since the cages are arranged in vertically-spaced inclined tiers, the egg collecting belts similarly are vertically and horizontally displaced, thus making it necessary to provide a collecting mechanism for receiving eggs at horizontally-spaced different vertical levels. The collecting mechanism then transports the eggs to an accumulating or main conveyor extending across the ends of each row of cages such that all of the eggs from the installation can be transported to a centralized processing and packaging area.

There have been several methods proposed for such a collection and transferring process, the most common of which is to provide a generally vertically movable egg receiving assembly which receives eggs at different vertical levels and lowers them to a main conveyor positioned below the level of the input egg belt conveyors. The difficulty with such a system lies in the fact that the main conveyor must be positioned below the lowermost input egg belt conveyor thereby putting severe restrictions on the overall system installation.

U.S. Pat. No. 3,166,175, issued Jan. 19, 1965, to J. S. Kurtz, et al. and assigned to the present Assignee discloses an egg collecting and conveying system by which an elevator is employed which receives eggs on one side, carries them up and over the top of an endless loop egg holding mechanism and transfers the eggs from one set of fingers on the input side of the conveyor to another set of adjacent fingers as the eggs are carried over the top of the elevator. This system permits the discharge of the eggs to a main conveyor which is positioned on the opposite side of the elevator at any convenient height.

Other egg elevating systems have been proposed by which generally curved fingers are attached to a single wide belt and receive eggs on an input side of an elevator and transfers the eggs to an opposite facing leg as the eggs move over the top of the elevator. U.S. Pat. No. 4,299,051 issued Apr. 22, 1980, entitled EGG TRANSPORTING and assigned to the present Assignee, represents an improved egg elevator design of this general type. Nonetheless, the eggs are collectively transported from each egg belt conveyor directly onto the elevator which must move rapidly to keep up with the incoming flow of eggs received in random orientation and in groups. As a result, significant egg breakage at the interface between the egg belt conveyors and the egg elevator still occurs. A transfer mechanism comprising rotating star wheels for carrying eggs between wire mesh trays communicating with the egg belt conveyors and the elevators has been employed, but the use of mesh trays slows the flow rate of eggs through the system. Also, in conventional elevators, since the egg handling cradles are secured to a single belt, adjustments, modifications, or repairs to the elevator are difficult and little or no flexibility to accommodate for each egg belt conveyor is possible.

Accordingly, there exists a need for an improved egg handling system which provides a flexible system which can be adapted for installations with different numbers of infeed egg conveying belts and different levels of output main conveyors and provides high speed operation with a minimum of breakage.

SUMMARY OF THE INVENTION

The present invention overcomes the deficiencies of the prior art by providing an egg collector and transporting system in which a plurality of rows of egg belt conveyors are coupled to the input side of an elevator by a transition mechanism which divides eggs into multiple paths and orients them in a predetermined fashion before depositing them onto the elevator. The elevator includes separate endless loop belts for each egg belt conveyor, each of which includes egg transporting cradles for receiving eggs from the transition mechanism and transferring the eggs to a main conveyor at the output side of the elevator.

In one embodiment of the invention, the endless loop belts of the elevator extend between independently adjustable drums. In other embodiments of the invention, the output end of the elevator includes a unique egg stripping device for providing rapid egg acceleration as they leave the elevator and travel toward the main conveyor. In still further embodiments of the invention, egg slowing means are attached to the top of the elevator to provide a smoother transition from cradle to cradle as the eggs travel over the top of the elevator.

These and other objects, features, and advantages of the present invention will become readily apparent upon reading the following description thereof together with the accompanying drawings in which:

BRIEF DESCRIPTION OF THE DRAWINGS

FIG. 5 is an enlarged, fragmentary, pictorial, left side, elevational view of the elevator structure shown in FIG. 1;

FIG. 6 is a fragmentary, front elevational view of the structure shown in FIG. 5;

FIG. 7 is an enlarged, fragmentary, rear elevational view of a portion of the structure shown in FIG. 6;

FIG. 8 is a left side, elevational view of the structure shown in FIG. 7;

FIG. 9 is a cross-sectional view of the structure shown in FIG. 7 taken along section line IX—IX of FIG. 7;

DETAILED DESCRIPTION OF THE PREFERRED EMBODIMENT

Figure 1:
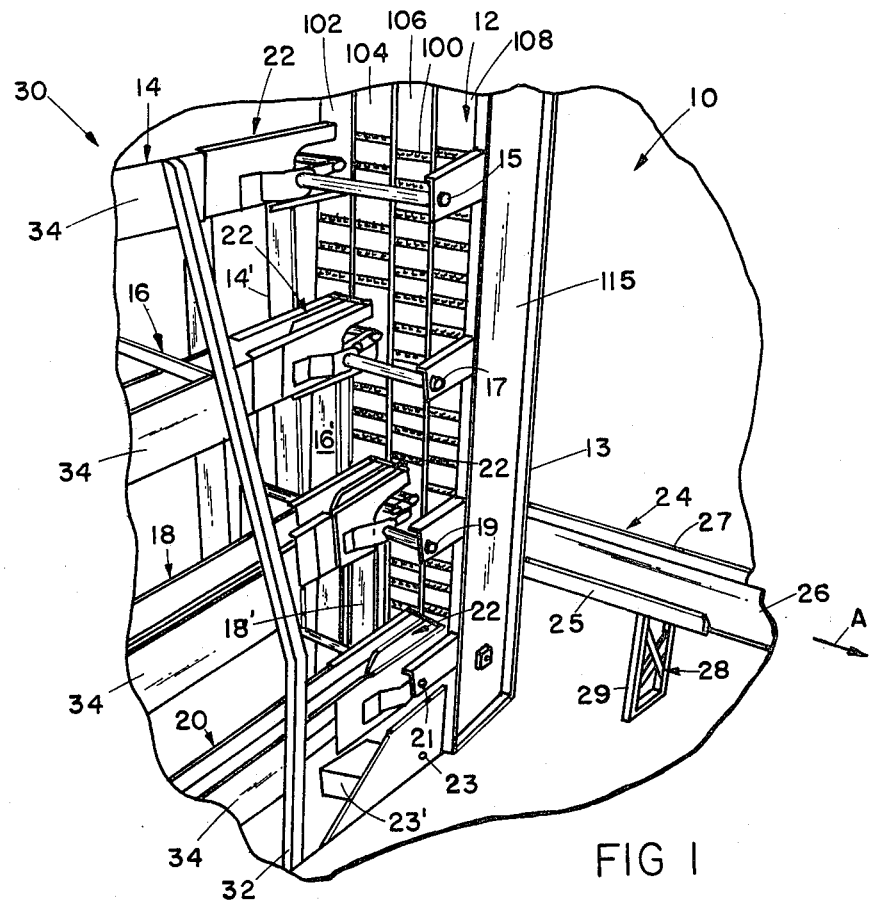
FIG. 1 is a perspective view of the apparatus embodying the present invention.

Referring initially to FIG. 1, there is shown the egg handling apparatus of the present invention including an egg elevator 10 having an input side 12 to which four alternately, horizontally and vertically staggered belt egg input conveyors 14, 16, 18 and 20 are coupled by means of four identical egg transition means 22. In the preferred embodiment, elevator 10 is designed to accommodate four such input belt conveyors although it is to be understood that the width and height of the elevator can be modified to accommodate any reasonable number of input conveyors. On the output side 13 of the elevator there is provided a main or accumulation conveyor 24 having a conveyor belt 26 conventionally supported by a roller bed framework 28, in turn, supported by suitable legs 29. Side ledges 25 and 27 are provided such that eggs discharged onto belt 26 will remain captive to the conveyor. Conveyor belt 26 is conventionally powered and moves in a direction indicated by arrow A to transport eggs from the collection area at which the elevator 10 is located to an egg processing and/or packaging area. In a typical installation, several elevators 10 will be positioned along the main conveyor 24 at spaced locations.

The egg belt conveyors 14, 16, 18 and 20 are suitably supported by a framework 30 including vertical legs 32 and horizontally extending support channels 34 for each of the conveyors which communicate with the egg collecting trough of the cage system. The cage system can be of the type disclosed in U.S. Pat. No. 4,212,269 issued July 15, 1980, entitled *POULTRY CAGES* and assigned to the present Assignee. Each of the vertically-spaced egg belt conveyors 14, 16, 18 and 20 are horizontally offset with their conveyor belts (14' through 20') extending vertically downwardly over drive axles 15, 17, 19 and 21, and are driven by a common power shaft 23 by drive means 23' shown schematically in FIG. 1. As will be explained more fully hereinafter, axles 15, 17, 19 and 21 are thus driven by the egg belts and these axles in turn drive the transition mechanism 22 for transferring eggs from the egg belt conveyors onto the elevator 10. The construction and operation of one of the identical transition mechanisms 22 is now described with reference to FIGS. 2 through 4.

Figure 2:
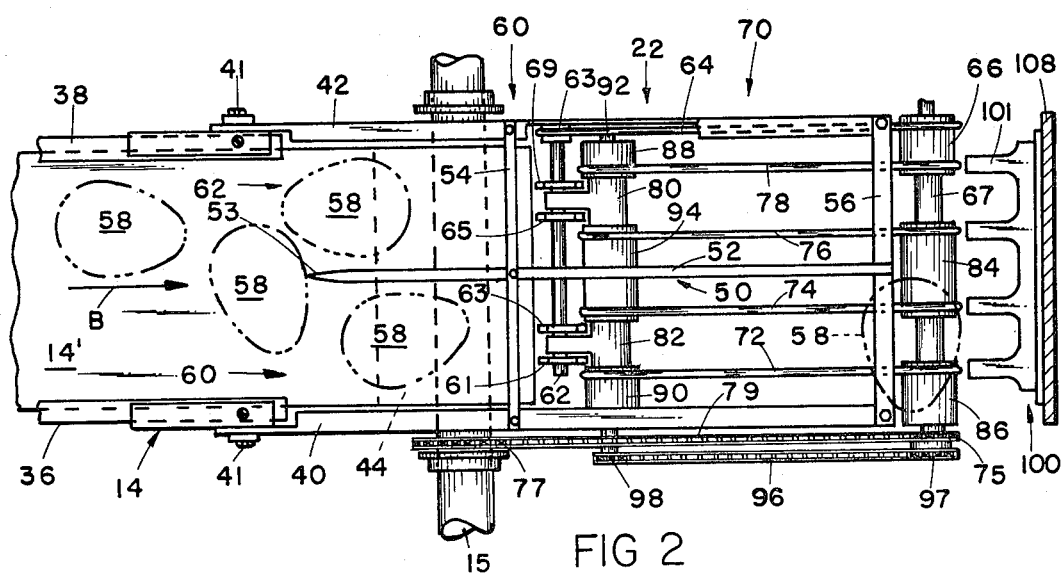
FIG. 2 is a fragmentary, enlarged, top plan view of the transition mechanism of the present invention.

FIG. 2 shows the uppermost egg belt conveyor 14 which includes an endless loop belt 14' moving in a direction indicated by arrow B in the Figure. The conveyor is supported by framework 34 including sidewalls 36 and 38 which keep eggs 58 on the belt and also provide support for the movable belt. Side frames 36 and 38 are bolted to sidewalls or frames 40 and 42 of the transition mechanism 22 by means of bolts 41. Sidewalls 40 and 42 are bowed outwardly slightly to provide a slightly wider area which accommodates, as described below, egg dividing and orienting means 50. Belt 14' extends over a roller 44 secured to shaft 15 for driving shaft 15. Belt 14' then extends downwardly to the drive axle 23, and conventional motive and belt slack adjustment means 23', shown schematically in FIG. 1.

Figure 3:
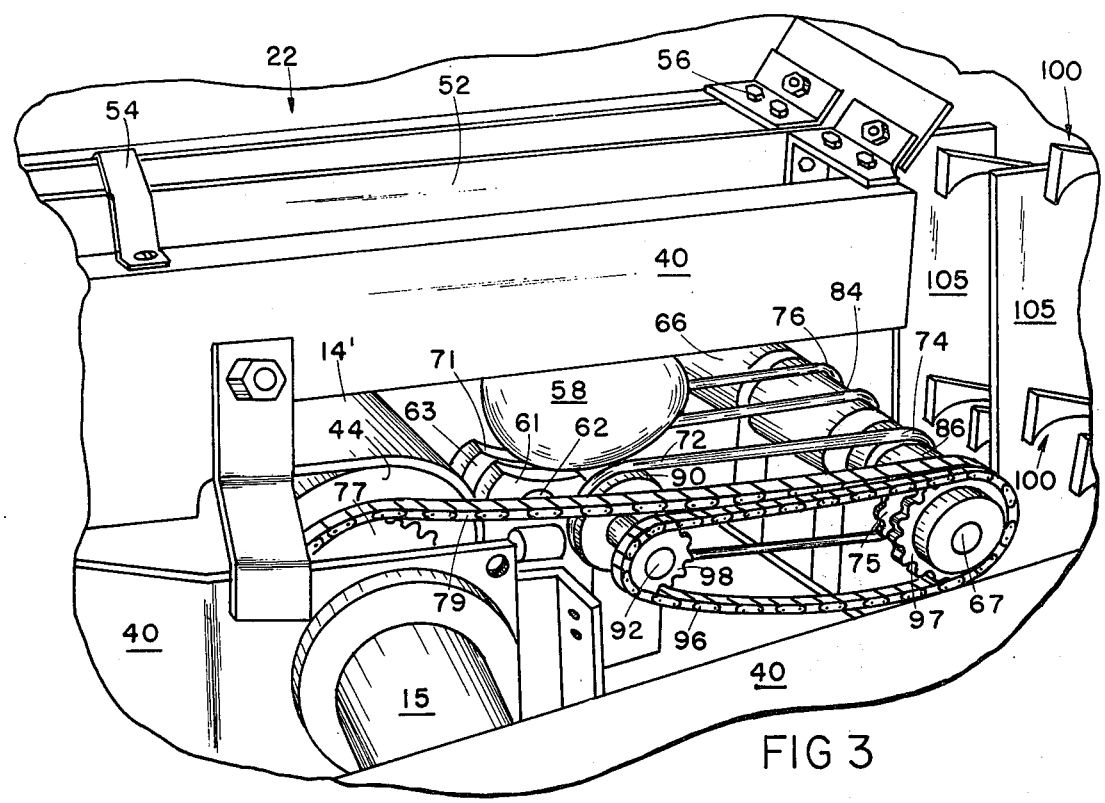
FIG. 3 is a fragmentary, perspective view of the transition mechanism shown in FIG. 2, with an egg near the input end.
Figure 4:
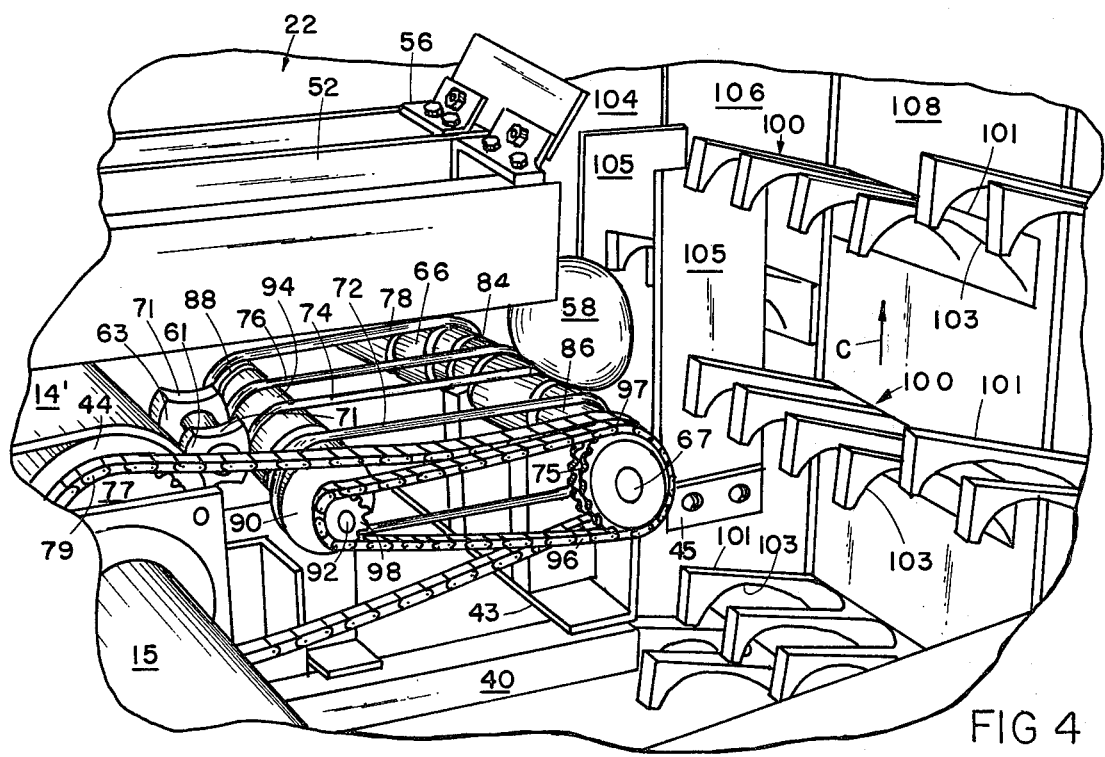
FIG. 4 is a fragmentary, perspective view of the transition mechanism showing an egg at the output end.

As seen in FIGS. 2 through 4, the dividing means 50, forming a part of the transition mechanism, comprises a vertically extending partitioning wall 52 having a vertically extending knife edge 53 at its leading edge and extending downwardly from the top surface of walls 40 and 42, and supported by means of horizontally-spaced cross braces 54 and 56. The lower edge of wall 52 is spaced slightly above belt 14'. Walls 40 and 42 adjacent partition wall 52 are spaced to permit eggs 58 to fit longitudinally in the two channels 60 and 62 defined by the sides of partitioning wall 52 and walls 40 and 42. Thus, at the inlet end of the transition device near cross brace 54, the eggs are singulated into two channels 60 and 62 with their major axis extending longitudinally in the direction of flow of the eggs indicated by arrow B.

The transition mechanism further includes a first transfer means 60 for transferring eggs 58 from the belt 14' onto second transfer means 70 comprising four endless loop belts 72, 74, 76 and 78 with outer belts 72 and 78, and the inner belts 74 and 76. The first transfer means comprises an axle 62 driven by a pulley 63 at one end which is coupled to a drive belt 64 extending to a drive pulley 66 mounted on shaft 67. Shaft 67, in turn, is driven by a sprocket 75 secured to shaft 67 and coupled to a second sprocket 77 mounted to shaft 15 by means of a first drive chain 79.

Mounted to shaft 62 are four spaced star wheels 61, 63, 65 and 69 spaced in pairs of two, such that each pair aligns between a pair of the endless loop drive belts of the transition mechanism as seen in FIG. 2. Each wheel includes a pair of concave surfaces 71 (FIGS. 3 and 4) comprising a concave arc of approximately 120° of the circumference of the otherwise disc-shaped wheels. Shaft 62 is rotatably supported by bushings 80 and 82 secured to the frame members 40 and 42 by suitable brackets (not shown). The wheels are rotated in a plane parallel to the direction of motion of the eggs and in a clockwise direction as seen in FIGS. 3 and 4, and eggs are cradled in recesses 71 and transferred by the rotating wheels onto the endless loop belts 72 through 78.

Shaft 67 is rotatably mounted between walls 40 and 42 by suitable bearings and includes, in addition to drive pulley 66 secured thereto, a free wheeling pulley 84 and another drive pulley 86 secured to shaft 67. Each of the pulleys 66, 84 and 86 include annular recesses therein for receiving the O-ring belts 72, 74, 76, 78 and the O-ring drive belt 64. Outer pulleys 66 and 86 drive free wheeling pulleys 88 and 90 rotatably mounted on a forward shaft 92 extending between sidewalls 40 and 42, such that outer belts 72 and 78 are driven at a first speed through the rotation of shaft 67.

Shaft 92 is likewise rotatably mounted to the framework associated with sidewalls 40 and 42, and includes a drive pulley 94 secured thereto such that when shaft 92 is driven, inner belts 74 and 76 are driven at a second speed which is accomplished by means of an outer drive chain 96 coupled to drive shaft 67 by means of a sprocket 97 and to shaft 92 by means of a smaller drive sprocket 98. In the preferred embodiment of the invention where the egg conveyor belt 14' moves at a lineal speed of 6.5 feet per minute, the outer egg carrying belts 72 and 78 were driven at a lineal speed of 5.1 feet per minute, while the inner belts 74 and 76 were driven at a lineal speed of 8.34 feet per minute. Belts 72 and 74 (and 76 and 78) are horizontally spaced from each other a distance such that eggs of any normally encountered size will be supported thereon. In the preferred embodiment, the spacing was one and one-eighth inches, while the spacing between shafts 92 and 67 was approximately four inches. The effective transferring speed of the belt transferring mechanism of the transition mechanism 70 was 6.72 feet per minute such that eggs from belt 14' can be carried onto the elevator 10 preventing jams.

As can be appreciated by employing an openwork transition mechanism 70, pieces of any eggs which are broken as they leave the cages or otherwise break, will fall downwardly through the mechanism without causing interference with the flow of incoming eggs. As can be seen in FIGS. 2 through 4, since the inner drive belts move at a speed faster than the outer drive belts, eggs entering the input end of the transition mechanism are rotated approximately 90° from their longitudinally aligned position established by the dividing wall 52 to a transversely aligned position with their major axis extending transversely as shown in FIG. 4 and as also shown in phantom form in FIG. 2. The eggs thus, are transferred onto the egg receiving cradles 100 of elevator 10 such that when discharged by the elevator, they will easily roll onto the main conveyor belt.

By dividing the eggs into two flow paths, a greater number of eggs can be transferred at a given speed and thus, the egg elevator 10 can be run at a slightly slower speed since the egg density has been increased. Thus, the number of eggs on the egg elevator at any given time is greater with the efficient transition mechanism shown in FIGS. 2 through 4. In the preferred embodiment of the invention, the diameter of wheels 61, 63, 65 and 69 is selected such that they provide a smooth transfer of eggs from the three-inch diameter end roller 44 of the egg belt conveyor onto approximately the one-inch diameter size of pulleys 88, 90 and 94. The wheels are spaced to provide the transfer of the eggs when aligned longitudinally as shown in FIG. 3 and shaft 62 is positioned approximately midway between the gap between the outer edge of belt 14' and the receiving belts 72, 74, 76 and 78.

As best seen in FIGS. 3 and 4, eggs from the transition mechanism 22 are transferred onto the upwardly moving egg carrying cradle assemblies 100 which are secured to endless loop elevator belts 102, 104, 106 and 108 of the elevator 10 as seen also in FIGS. 5 and 6. The egg carrying cradle assemblies each include four fingers having a generally flat and downwardly and inwardly inclined upper surface 101 (FIG. 4) which carries eggs on the input end 12 of the elevator 10 and a concavely curved, lower surface 103 to which the eggs are transferred to the adjacent cradle assembly as the eggs are moved over the top of the elevator 10. Extending between each of the cradles of the endless belts at the input side 12 of the elevator there is provided a vertical partitioning wall 105, as best seen in FIGS. 3 and 4, which are mounted to a cross member 43 extending between frame members 40 and 42 of the transition mechanism 22 by means of brackets 45. The partitioning walls 105 thereby assure that eggs will be transferred onto a pair of supporting fingers of the cradle assemblies without falling off of the edges.

The endless loop elevator belts 102, 104, 106 and 108 are supported at the top end by rotatable, cylindrical idler drums 110, 112, 114 and 116 respectively and at the lower end by cylindrical drive drums 118, 120, 122 and 124 respectively. The lower drums 118 through 124 are fixedly secured to a drive shaft 119 driven by a suitable drive means (not shown) and which is rotatably supported between vertically extending support walls 115 and 117 of the elevator. The lower framework includes cross support 121 and suitable upper cross members are also included to provide a rigid framework for supporting the elevator mechanism. The tension for the endless loop belts of the elevator can be individually adjusted by means of the belt tensioning mechanism 140 which is shown in detail in FIGS. 7 through 9.

The belt tensioning mechanism includes a fixed shaft 142 extending between end frame members 115 and 117 which includes four spaced vertically extending apertures 141 for slideably receiving therein one end of a push rod 144 having its opposite end threadably secured to a roller supporting clevis 145. Rod 144 is threaded at its upper end to receive an adjustment nut 146 and an underlying washer 147 while a compression spring 148 surrounds rod 144 and extends between the upper surface of rod 142 and the lower surface of adjustment nut 146 through washer 147. Between the tines of the clevis, there is mounted an idler roller 150 rotatably mounted to a shaft 152 extending between the tines of the clevis. A pair of spacer arms 154 and 156 having downwardly projecting slots 155 into which shaft 152 is nested extend rearwardly and are pivotally secured to a fixed shaft 158 extending between end walls 115 and 117 of the elevator. A pair of idler rollers 160 and 162 are mounted rotatably on shaft 158 outboard of arms 154 and 156. Arms 154 and 156 have a length such that the rollers 150, and 160 and 162 are spaced to support drum 110 in a triangular line contact manner on opposite sides of the axis of rotation of the drum. Each of the drums 110, 112, 114 and 116 includes identical adjustment means so they can be independently adjusted by the adjustment mechanism 140 since they thus, do not necessarily share a common axis of rotation.

For changing the endless loop belts of the elevator, as best seen in FIG. 6, a cam mechanism 170 is provided at each side of the elevator and a roller follower 172 is mounted to each end of the shaft 142 near the sidewalls of the elevator and is engaged by cam 174 actuated by levers 175 which moves shaft 142 upwardly to tension all of the belts in a course manner while the individual tensioning mechanism 140 is used to provide individual tensioning control for each of the drums 110 through 116. Shaft 142 is mounted to the end walls by slide means 176 through a slot in end walls 115 and 117 such that the shaft 142 can be vertically moved by the cam mechanism 170. For adjusting the tension on the individual drums, nut 146 can be rotated in a clockwise direction (to move the nut downwardly in figures) to compress spring 148 and thereby reduce the tension on the belt wound around the individual drum. Rotating the nut in counterclockwise direction increases the belt tension. It is to be understood that although the adjustment mechanism only for drum 110 is described in detail, the adjustment mechanism shown in FIGS. 7 through 9 is identical for each of the four drums 110, 112, 114 and 116. All of the adjustment mechanisms share the cross shafts 142 and 158 and gross motion adjustment cam mechanism 170.

Figure 10:
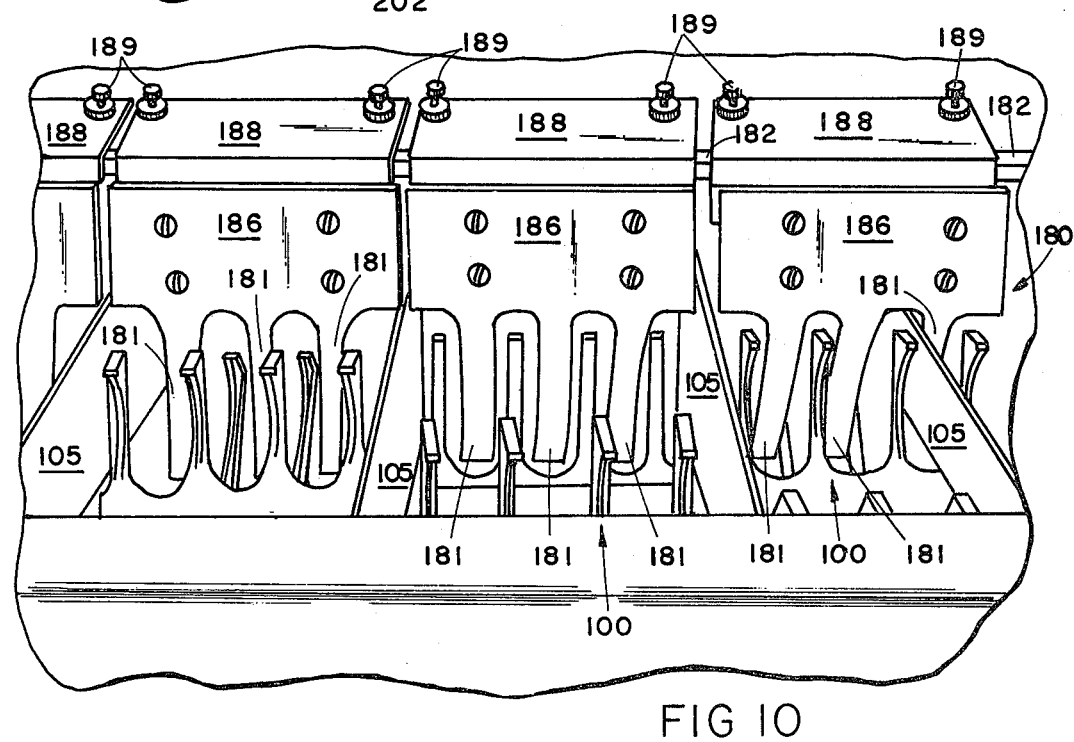
FIG. 10 is an enlarged, fragmentary, front elevational view of a portion of the structure shown in FIG. 1.

The egg conveying belts of elevator 10 are driven at a speed of about 10 feet per minute to accommodate the egg flow from the transition mechanism 22. Eggs conveyed by the elevator from input side 12 to discharge them on the main conveyor 24, are slowed in their transition between egg cradles at the top of the elevator, by downwardly projecting resilient fingers 181, shown in detail in FIG. 10. The fingers are positioned on a cross rod 182 supported by suitable bracket means 184 at the top center of elevator 10, as also seen in FIG. 5.

Elevator 10 of the preferred embodiment will include eight finger assemblies 180, two being associated with each of the egg conveying belts 110, 112, 114 and 116. The finger assemblies comprise three downwardly projecting fingers 181 spaced to fit between the fingers of egg receiving cradles 100 and having a length such that they do not interfere with the base of the cradles 100. The finger assemblies 180 integrally include a base 186 from which the fingers 181 integrally extend. Base 186 is secured to a mounting bracket 188, in turn, slideably secured to cross member 182 in an adjustable fashion and secured by means of adjustable fasteners 189 to accurately position fingers 181 in the interstitial space between the fingers of cradle assemblies 100. The finger assemblies 180 are made of high density polypropylene molded material having a thickness of approximately one-quarter of an inch, such that as the eggs are transferred from the upper surface 101 (FIG. 4) of the egg cradles 100, to the concave surface 103 of the next adjacent cradle, and as they move over the top of the elevator, they will be slowed by the resilient deflectable fingers 181 thereby preventing breakage of eggs during this transition of eggs from cradle to cradle.

Figure 11:
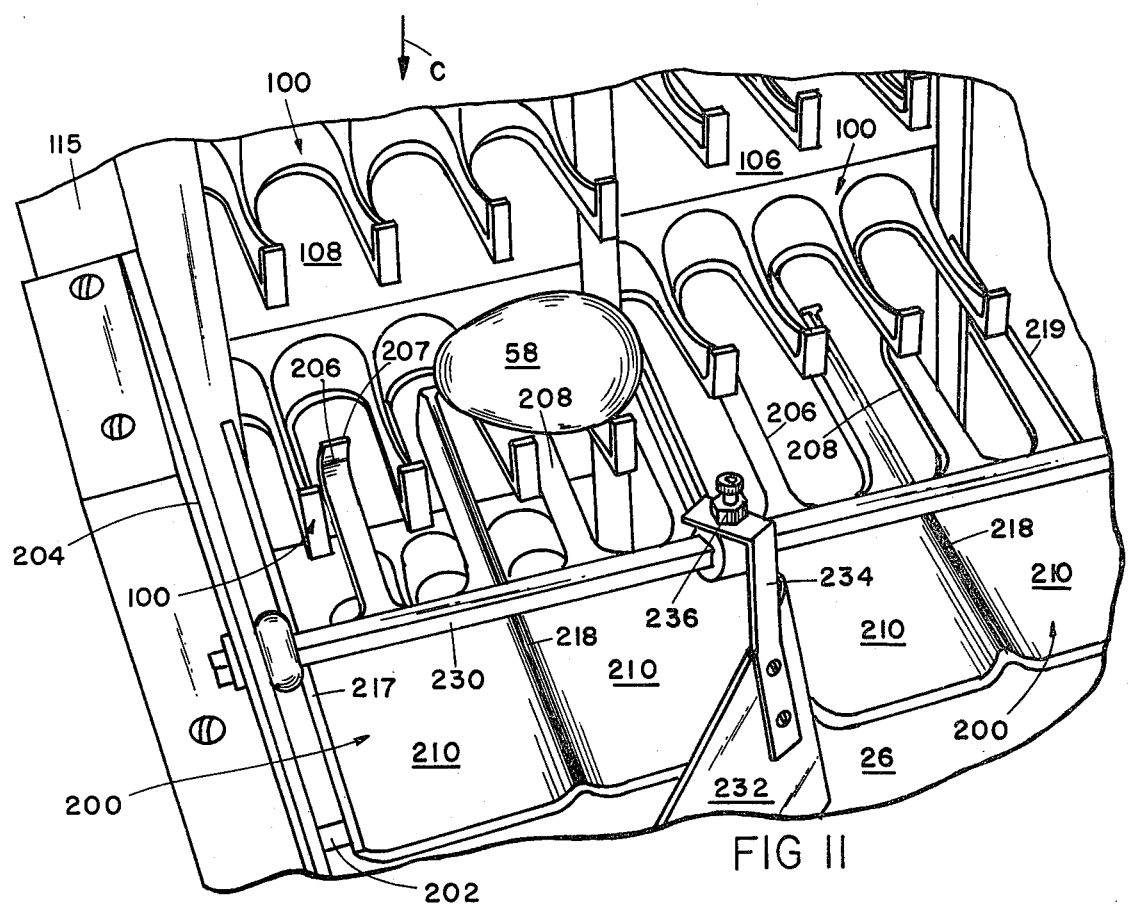
FIG. 11 is an enlarged, fragmentary, perspective view of the egg discharge portion of the elevator shown in FIG. 1.
Figures 12, 13:
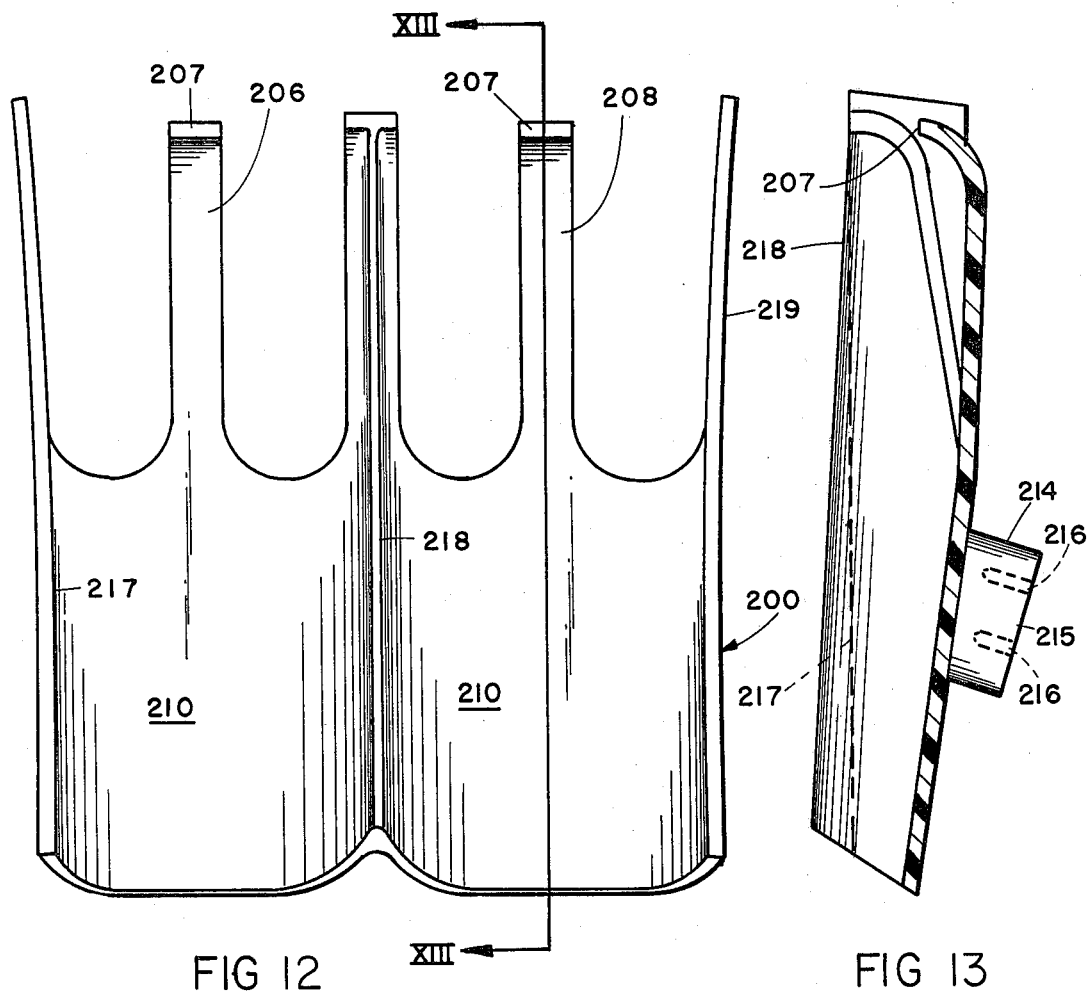
FIG. 12 is an enlarged, top plan view of a portion of the structure shown in FIG. 11.
FIG. 13 is a cross-sectional view of the structure shown in FIG. 12 taken along section line XIII—XIII of FIG. 12.

At the discharge end of elevator 10 where the eggs 58 are transferred onto the main conveyor 24, an improved stripper means 200 is provided which is shown in detail in FIGS. 11 through 14. The elevator includes four stripper assemblies, one being associated with each of the four endless loop belts, the function of which is to remove the eggs from the cradles 100 and provide an initial acceleration impulse to the egg and thereby providing a smooth transition of the eggs from the elevator onto the main conveyor belt. Each of the stripper assemblies 200 are mounted to a crossbar 202 (FIG. 11), in turn, supported by brackets 204 extending outwardly from each end 115 and 117 of the elevator. The strippers 200 comprise a member integrally molded of polypropylene and having a pair of spaced stripper fingers 206 and 208 which extend between adjacent egg supporting fingers of the cradles 100. Each of the fingers 206 and 208, in order to impart an initial rapid acceleration to the eggs, includes an upwardly curved tip or end 207, as best seen in FIG. 13. The radius of curvature of tip 207 is about 0.75 inches while the width of fingers 206 and 208 was about 0.35 inches and their lengths 2.4 inches from the junction with floor 210. Fingers 206 and 208 extend from a base defining a floor 210 which is inclined downwardly by means of a pair of mounting bosses 214, having a mounting surface 215 inclined with respect to floor 210. Bosses 214 have threaded aperture means 216 for receiving screws extending upwardly through the bottom of the crossbar 202 to mount assemblies 200 with the floors inclined downwardly at an angle of approximately 20°.

Figure 14:
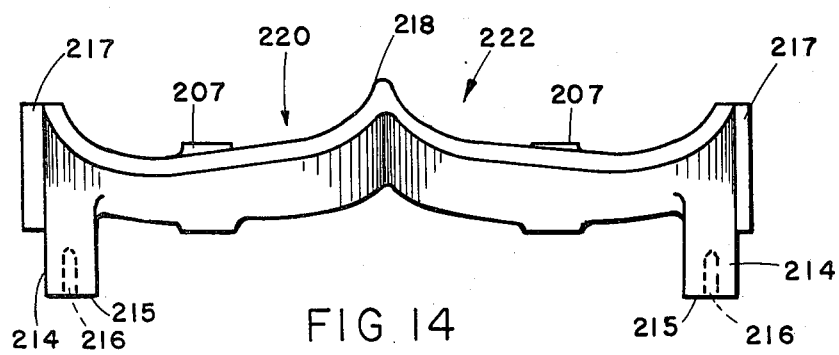
FIG. 14 is a end elevational view of the structure shown in FIG. 12.

Spaced, vertically, extending, curved partitioning walls 217, 218 and 219 define two troughs 220 and 222, as best seen in FIG. 14, having flat floors 210 and generally curved sidewalls for cradling eggs as they roll downwardly from the stripping means onto belt 26 of the main conveyor 24. The eggs exit the elevator, as best seen in FIG. 11 with their major axis extending transversely across the channels 220 and 222 such that they roll easily and a combination of the upwardly turned tips 207 of the stripper fingers 206 and 208, and the inclined floors 210 continue the smooth transition of the eggs from the elevator onto the conveyor belt 26 at a speed sufficient to allow the eggs to merge onto conveyor 26 with a minimum of interference with eggs previously placed on the conveyor. In order to direct the eggs in the downstream direction of the conveyor, a crossbar 230 is mounted between brackets 204, spaced high enough to permit eggs to roll thereunder, and includes deflector blades 232 mounted to the crossbar 230 by brackets 234 and adjustable clamps 236 in a conventional manner. As can be appreciated, four such deflectors 232 are employed with each elevator and assist in directing the initial flow of eggs onto the conveyor 26 for the smooth merging of the eggs along the conveyor.

Thus, with the egg handling system of the present invention, means are provided for efficiently transferring eggs from egg belt conveyors onto an improved elevator means, as well as for removing eggs from the elevator and merging them onto a main conveyor.

It will become apparent to those skilled in the art that the many features of the present invention can be modified without departing from the spirit or scope of the invention as defined by the appended claims.

The embodiments of the invention in which an exclusive property or privilege is claimed are defined as follows:

1. In an egg transferring elevator including endless loop conveying means extending generally vertically and including egg carrying cradles having spaced fingers with a first surface for carrying eggs in an upward direction on one side of said elevator and a second surface for carrying eggs in a downward direction whereby eggs are shifted from said first surface of a cradle to said second surface of an adjacent cradle as the cradles travel over an upper end of said elevator, said endless loop conveying means mounted in a frame, means for slowing the transfer of egg from one cradle to another at the upper end of said elevator comprising:

a plurality of downwardly projecting resilient fingers spaced from one another and mounted to said frame at said upper end in the area where the transfer of eggs from one cradle to another occurs and extending into the space between fingers of said cradles to releasably engage eggs as they fall from one cradle to another thereby slowing and cushioning such transfer of eggs.

2. The apparatus as defined in claim 1 and further including a stripper member having a body with a plurality of stripper fingers extending therefrom and adapted to be mounted to incline upwardly toward the endless loop conveying means and extending between the fingers of said egg carrying cradles wherein the ends of said stripper fingers are curved to inpart a rapid acceleration to eggs stripped from said cradle to rapidly remove eggs from said elevator.

3. The apparatus as defined in claim 1 wherein said spaced resilient fingers are integrally formed from a sheet of polymeric material.

4. An egg transferring elevator including endless loop conveying means extending generally vertically and including egg carrying cradles having a first surface for carrying eggs in an upward direction on one side of said elevator and a second surface for carrying eggs in a downward direction whereby eggs are shifted from said first surface of a cradle to said second surface of an adjacent cradle as the cradles travel over an upper end of said elevator, said endless loop conveying means mounted in a frame, and means for slowing the transfer of egg from one cradle to another at the upper end of said elevator comprising downwardly projecting spaced resilient fingers mounted to said frame at said upper end in the area where the transfer of eggs from one cradle to another occurs and extending into the space between adjacent cradles to releasably engage eggs as they are transferred from one cradle to another thereby slowing and cushioning such transfer of eggs.

5. The apparatus as defined in claim 4 wherein said spaced resilient fingers are integrally formed from a sheet of polymeric material.

* * * * *

UNITED STATES PATENT AND TRADEMARK OFFICE
CERTIFICATE OF CORRECTION

PATENT NO. : 4,345,682
DATED : August 24, 1982
INVENTOR(S) : White et al.

It is certified that error appears in the above—identified patent and that said Letters Patent is hereby corrected as shown below:

Column 3, line 6:

"a" should be --an--

Column 6, line 40:

"course" should be --coarse--

Column 8, line 50:

"inpart" should be --impart--

Signed and Sealed this

Eighteenth Day of January 1983

[SEAL]

Attest:

GERALD J. MOSSINGHOFF

Attesting Officer     Commissioner of Patents and Trademarks